Aug. 4, 1959     F. J. VEILLETTE     2,897,645
LAWN MOWER REVERSIBLE FRICTIONAL DRIVE
Filed March 10, 1958     2 Sheets-Sheet 1
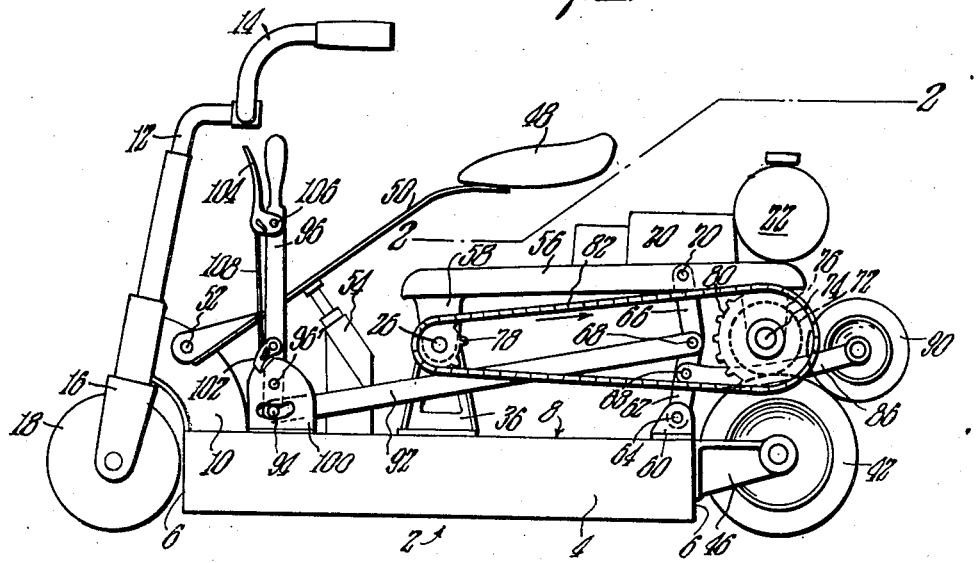
Fig. 1.
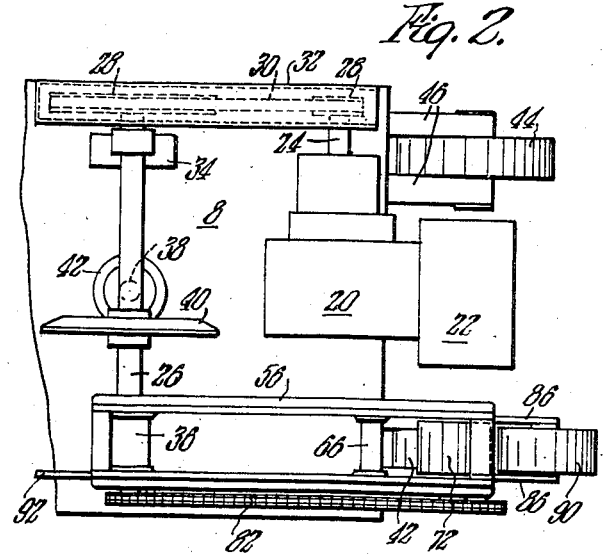
Fig. 2.
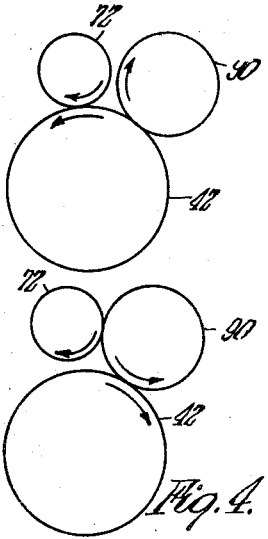
Fig. 3.
Fig. 4.
INVENTOR.
Frederic J. Veillette.
BY Aug. 4, 1959     F. J. VEILLETTE     2,897,645
LAWN MOWER REVERSIBLE FRICTIONAL DRIVE
Filed March 10, 1958     2 Sheets-Sheet 2

INVENTOR.
Frederic J. Veillette
BY

2,897,645
LAWN MOWER REVERSIBLE FRICTIONAL DRIVE

Frederic J. Veillette, Willimansett, Mass.

Application March 10, 1958, Serial No. 720,138

6 Claims. (Cl. 56—25.4)

This invention relates to new and useful improvements in a lawn mower of the rotary type driven by a gasoline engine, and is directed more particularly to a means for driving one of the supporting wheels of the mower.

The principal objects of the invention are directed to the novel means for driving one of the supporting wheels of a rotary mower in opposite directions.

According to the novel features of the invention, a driving mechanism is provided for operatively and frictionally engaging one of the supporting wheels of the mower which is constructed and arranged to operate for driving the mower forward or backward at the election of the operator.

The mechanism of the invention is simple in form so as to be economical to manufacture, is efficient in operation, and is readily and easily operated.

Various changes and modifications may be made in the form of the apparatus of the invention without departing from the spirit and scope thereof.

In the drawings:

Fig. 1 is a side elevational view of a rotary lawn mower embodying the novel features of the invention;

Fig. 2 is a plan view on the line 2—2 of Fig. 1;

Figure 5:
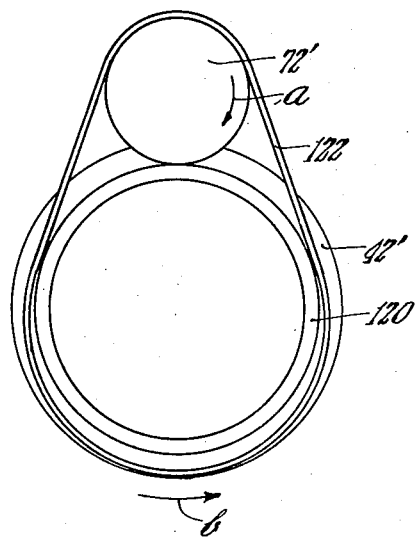
Figure 6:
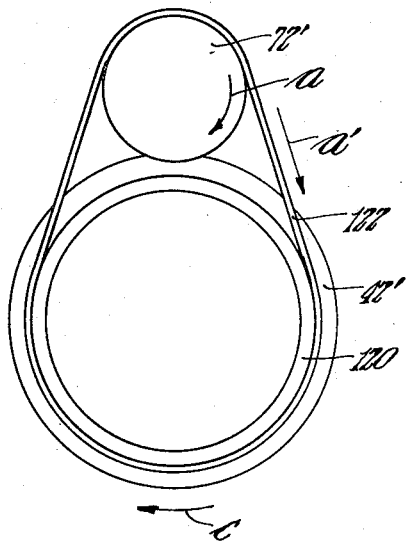

Figs. 3 and 4 are diagrammatic views to explain the operation of the frictionally engageable members of the apparatus; and Figs. 5 and 6 are diagrammatic views similar to Figs. 3 and 4, to illustrate a modified form of drive means.

Referring now to the drawings more in detail, the novel features of the invention will be described.

A base is shown at 2 which has depending side and end walls 4 and 6 respectively, and an upper wall 8. Such base will be strong and rigid for supporting the components of the mower.

A bracket 10 is secured to the forward end of the base in which is swivelled a steering column 12 having a pair of handle bars 14 at the upper end thereof. A fork 16 on the lower end of the column 12 has a steering wheel 18 journalled therein, for steering the mower.

A gasoline engine is represented by 20 which is fixed to the base in the usual manner, and a fuel tank therefor is represented by 22. Such forms no part of the present invention.

A drive shaft 24 of the engine 20 is operatively connected to a main shaft 26 of the mower, by pulleys 28—28, and a belt 30. Sprockets and a chain may be employed in lieu thereof, if desired. A guard 32 covers the driving connections.

The main shaft is journalled for rotation in one or more bearings 34 and 36 which are secured to the upper wall 8 of the base.

A shaft 38 for a rotary cutter is journalled in the upper wall 8 of the base, for a cutter located below said upper wall, but forms no part of the present invention.

Bevel discs 40 and 42 carried by the shafts 26 and 38 respectively are arranged for frictional engagement whereby the cutter shaft 38 is rotated by the shaft 26. Means may be employed for exerting pressure for engagement of the discs, if desired.

A pair of supporting wheels 42 and 44 are journalled in brackets, such as 46, which are secured to the rear end of the base. The structure is supported by said wheels and the steering wheel.

A seat 48 is carried by the upper end of a somewhat resilient support 50 which is pivoted at 52 to the bracket 10. A brace 54 is secured to the upper wall 8 of the base and underlies the support 50 which rests thereon.

An elongated beam 56, which may consist of a casting, has depending portions 58 at the forward end thereof, which are journalled on the shaft 26 at opposite sides of the bearing 36.

A bearing 60 is secured to the upper wall 8 of the base, and a lower link 62 is pivoted thereto at 64. An upper link 66 has a lower end pivoted at 68 to the upper end of the lower link, and the upper end of said upper link 66 is pivoted at 70 to the beam 56.

A drive roll 72 is fixed to a shaft 74 which is journalled in arms 76 at opposite sides thereof which depend from the rear end portion of the beam 56.

A drive sprocket 78 is fixed to the shaft 26 and a driven sprocket 80 is fixed to the shaft 74. Said sprockets are connected by an endless drive chain 82. By this means, the roll 72 is driven from the shaft 26.

A pair of secondary pull links 86 are pivoted at 88 to the lower link 62, and have a reverse roll 90 journalled therein.

A primary link 92 has a rear end connected to the pivot 68 of the links 62 and 66, and a forward end thereof is pivotally connected at 94 to the lower end of a shift lever 96.

The shift lever 96 is pivoted at 96' to a bracket 100 fixed to the base for swinging back and forth.

A pawl 102 is pivoted to the lever 96, and engages in a notch of the bracket 100, as shown. A release member 104 is pivoted at 106 to said lever 96, and is connected by a rod 108 to the pawl 102 for withdrawing said pawl from the notch of the bracket.

With the shaft 26 in rotation and with the roll 72 in engagement with the wheel 42, the mower will be driven forwardly. The pawl in the notch of the bracket 100, and the other parts are arranged to insure driving contact of the roll 72 with the wheel 42, as illustrated in Fig. 3, wherein it will be seen that roll 90 is out of contact with roll 72, and acts as an idler, merely rolling on wheel 42.

When it is desired to propel the mower rearwardly, the lever 90 is pulled clockwise. In this motion, the link 92 pulls on the links 62 and 66 which elevates the beam to space roll 72 from the wheel 42, and moves roll 90 into engagement with both the roll 72 and the wheel 42, as illustrated in Fig. 4.

A modified form of drive means will be described with reference to Figs. 5 and 6.

A drive roll 72', corresponding to the roll 72, is driven clockwise in the direction of arrow a. In the lower position of the beam 56, in which said roll 72' is rotatable, the said roll 72' engages a drum 120 which is integral with one supporting wheel such as wheel 42'. As the roll 72' is rotated as indicated, the supporting wheel is rotated in the direction of arrow b to propel the lawn mower forward.

An endless belt or driving band 122 extending around the roll 72' and drum 120 is in the lower position of the beam, loose on said drum, as in Fig. 5.

When the beam 56 is moved to its upper position so as to separate the roll 72' from the drum 120 as in Fig. 6, the band 122 engages the drum 120. The band, being driven in the direction of arrow a' and in engagement with the drum 120, drives the supporting wheel 42' reversely in the direction of arrow c so that the lawn mower is propelled rearward.

The surface of the drum will be provided with a plurality of depressions or the like to insure a driving contact between the band and drum.

While the invention has been described in the form at present preferred, various changes and modifications in the form of the invention may be made without departing from the spirit and scope thereof. It is desired therefore to be limited, if at all, by the appended claims, rather than by the foregoing description.

I claim:

1. In a power driven lawn mower of the type having a horizontal base provided with front and rear ends, a power unit on said base having a drive shaft, a steering wheel supporting the front end of said base, and transversely spaced base supporting wheels journalled at the rear end of said base, a main drive shaft connected to the shaft of said power unit and bearings carried by said base forwardly of the rear end thereof rotatably supporting said shaft transversely of said base, a rigid beam having a forward end pivoted on said drive shaft for swinging of a rear end thereof between upper and lower positions, a driven shaft journalled in the rear end of said beam and driving connections between said driven shaft and said main shaft, a drive roll fixed on said driven shaft engageable with one of said supporting wheels in lower position of the rear end of said beam and disengageable therefrom in upper position thereof whereby said wheel may be rotated by said roll in lower position of said beam end, a manually operable shifting member mounted on said base for movements in opposite directions, interconnecting means connecting said shifting member and base and beam adapted and arranged whereby as said shifting member is moved in one direction the end of said beam is positioned in lower position and when said member is moved in an opposite direction the end of said beam is moved to upper position, a rotatable reverse drive roll operatively connected to said interconnecting means and operable thereby in upper position of said beam end to contact said reverse roll with said drive roll and said one supporting wheel and in lower position of said beam end to contact said reverse roll with said one supporting wheel only, a cutter shaft mounted in said base for rotation on a vertical axis, and friction driving connections between said cutter and main shafts.

2. In a power driven lawn mower of the type having a horizontal base having front and rear ends, a power unit thereon having a drive shaft, a steering wheel supporting the front end of said base, a pair of transversely spaced base supporting wheels at the rear end of said base, a main shaft operatively connected to the shaft of the power unit and bearings fixed to said base rotatably supporting said shaft, an elongated rigid beam having a front end pivotally connected to said main shaft for swinging of the rear end of the beam between upper and lower positions relative to one of said supporting wheels, a driven shaft journalled in said rear end of the beam having a drive roll fixed thereto, driving connections between said driven shaft and main shafts, a manually engageable shifting member and means mounting said member on said base for movements in opposite directions, connecting means interconnecting said base and beam and shifting member arranged for movement in one direction as the shifting member is moved in one direction to swing the rear end of the beam to lower position and operatively engage said drive roll with one of said supporting wheels and adapted for movement in an opposite direction as said shifting member is moved in an opposite direction to swing said rear end of the beam upwardly and disengage said roll and wheel, a reverse roll, and actuating means rotatably connecting said roll to said connecting means arranged as the rear end of the beam is in lower position to contact said reverse roll with said drive wheel and said one supporting wheel and when said beam end is in lower position to contact said reverse roll with said wheel only.

3. A power driven lawn mower as set forth in claim 2 wherein the axes of rotation of said main and driven shafts are parallel.

4. A power driven lawn mower as set forth in claim 2 wherein said driving connections includes, sprockets fixed to said main and driven shafts and an endless chain in engagement therewith.

5. A power lawn mower as set forth in claim 2 wherein said connecting means includes a pair of upper and lower links pivotally connected at upper and lower ends to said beam and base respectively and a link pivotally connected at one end to said shifting member and pivotally connected at an opposite end to the adjacent ends of the links of the pair thereof.

6. A power lawn mower as set forth in claim 2 wherein said connecting means includes a pair of links having outer ends pivotally connected to said base and beam respectively and a link having opposite ends pivotally connected to said shifting member and inner ends of the links of the pair thereof and said actuating means includes link means having said reverse roll rotatable in one end thereof and a pivotal connection between the opposite end of said link means and on one of the links of the pair thereof.

References Cited in the file of this patent

UNITED STATES PATENTS

| | | |
|---|---|---|
| 243,526 | Dickinson | June 28, 1881 |
| 1,063,231 | Weber | June 3, 1913 |
| 2,722,841 | Becker | Nov. 8, 1955 |
| 2,809,705 | Sewell | Oct. 15, 1957 |